Dec. 13, 1932.   W. S. SEARLES   1,891,016
OPHTHALMIC FRAME
Filed Aug. 25, 1931   2 Sheets-Sheet 1

Inventor
Wayne S. Searles,
By Horatio E. Bellows
Attorney

Dec. 13, 1932. W. S. SEARLES 1,891,016
OPHTHALMIC FRAME
Filed Aug. 25, 1931  2 Sheets-Sheet 2
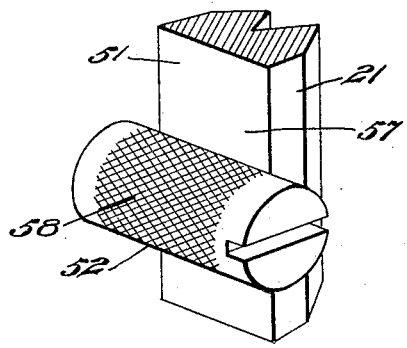
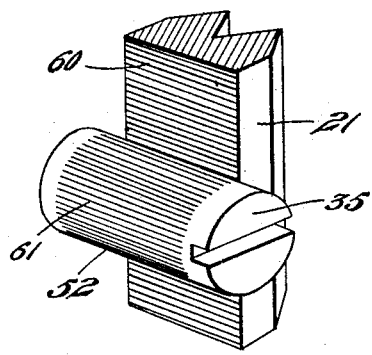
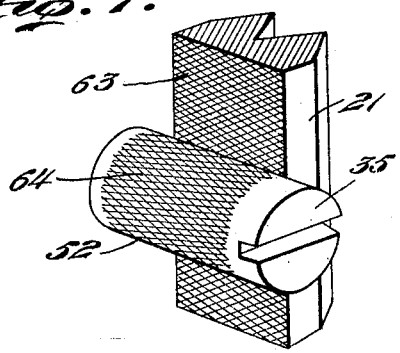
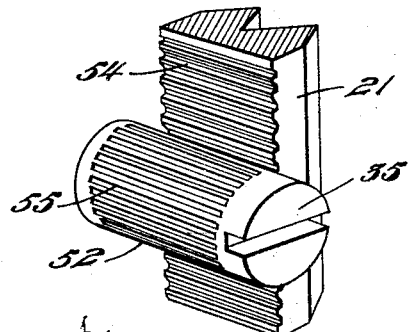
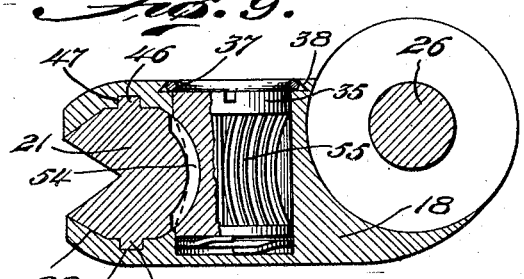
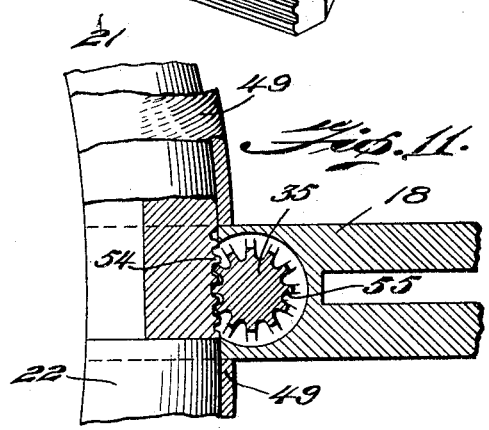
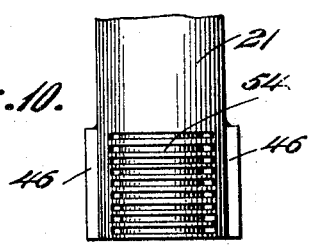
Inventor
Wayne S. Searles,
By Horatio E. Bellows
Attorney Patented Dec. 13, 1932

1,891,016

UNITED STATES PATENT OFFICE

WAYNE S. SEARLES, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND

OPHTHALMIC FRAME

Application filed August 25, 1931. Serial No. 559,241.

My invention relates to the frames of spectacles and eyeglasses and more particularly to the rims or eye wires and their mountings.

The essential objects of my invention are to enable the exchange or insertion of a lens in the rim without the removal of the temple or any screw; to accommodate the rim for lenses of varying sizes; to prevent loosening of the lenses; to prevent accidental escape of the operating roll and render the same inconspicuous; to increase the strength of the mounting; and to attain these ends in a sightly structure, simple and inexpensive to construct and facile to operate.

Further objects of my invention will appear from an examination of the drawings and following description.

My invention consists, therefore, in the means and mechanism for producing the results above specified substantially as hereinafter claimed.

Figure 1:
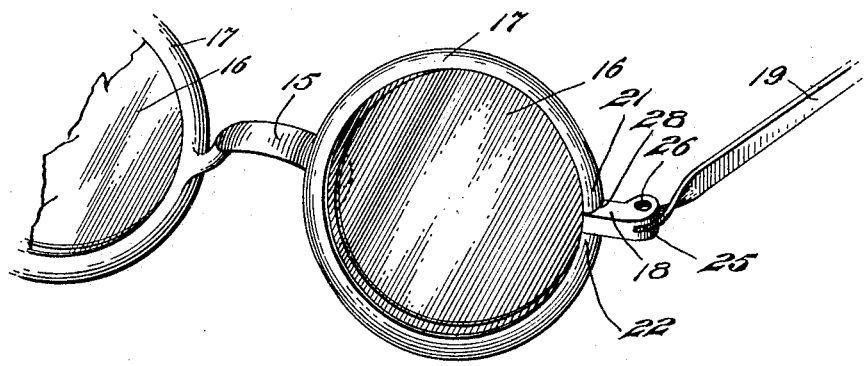
Figure 2:
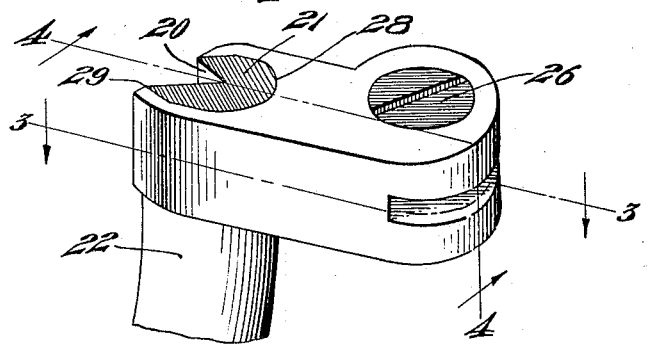
Figure 3:
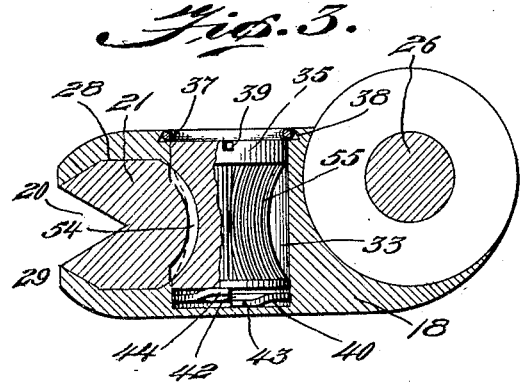
Figure 4:
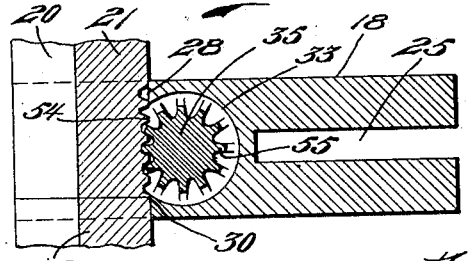

In the accompanying drawings which are a part of this specification, and in which are shown merely preferred forms of embodiment of my invention, Figure 1 is a fragmentary perspective view of a pair of spectacles in which my invention is embodied, Figure 2, an enlarged perspective of an end piece showing the rim in transverse section, Figures 3 and 4, sections of the same on lines 3—3 and 4—4 respectively of Figure 2, Figure 5, an assembly perspective view of a modified form of the roll and of a length of the cooperating rim portion, Figures 6, 7, and 8, like views of further modified forms of the same, Figure 9, a section of another modified form of the invention taken on a line corresponding with 3—3 of Figure 2, Figure 10, a fragmentary front view of a portion of the rim shown in Figure 9, and Figures 11, a fragmentary section taken on line 4—4 of Figure 2 partially in elevation, of a further modification of the structure.

Like reference characters indicate like parts throughout the views.

As illustrated, 15 represents the bridge, 16 the lenses, 17 the rims or eye wires, 18 the end pieces, and 19 the usual temples of a pair of spectacles or analogous ophthalmic frame in which my invention is embodied. Each rim 17, provided with the usual annular groove or lens seat 20, as of metal or other usual resilient material, and split or transversely severed at a point adjacent the end piece, forming upper and lower end portions 21 and 22 respectively. Each end piece 18 is flat, oblong, and composed of a single integral block or body having in its outer end a slot 25 for its temple 19 attached by its pivot member 26. The inner end of each member 18 is provided with a vertically disposed guideway 28 for the slidable reception of the rim portion 21. This guideway is laterally open, as at 29, to admit the lens 16 carried by the adjacent rim. The rim portion 22 is fixed to the member 18 in any convenient manner. In this instance the former is rigidly held in the lower end of the guideway 28 by friction supplemented by solder, as at 30. A hole 33 extends from the rear face of the member 18 forwardly to a point near the front of the latter. This transverse hole is disposed tangentially to and opens laterally into the guideway 28. Mounted for rotary or circular movement in the hole is a roll 35 whose side is in frictional engagement with the rim portion 21, so that rotation of the former in either direction moves the slidable portion 21 towards or from the fixed portion 22, thus either tightening or loosening the grip of the rim 17 upon its enclosed lens 16.

The roll may be mounted in its described relative position in any convenient manner. When mounted as herein shown it is prevented from escape in an axial direction by a split spring locking ring 37 engaging its end face and seated in an under cut or dovetailed annular groove or enlargement 38 of the hole 33 at its open end. To facilitate the turning of the roll a diametrical slot 39 in its end face permits engagement of a screw driver or other tool. In order that the operating roll remain in any radial position to which it has been rotated a spring member, represented generally by 40, rests in the closed end of the hole 33. This comprises a flat annular resilient body 42 having laterally extending ends 43 and 44 engaging respectively the member 18 and the end of the roll 35. This spring exerts sufficient pressure upon the roll to afford the necessary frictional engagement of the latter with the locking ring 37.

It is advantageous but not imperative to provide the rim portion 21 with lateral longitudinal guide flanges 46, as shown in Figures 9 and 10, in which case the guideway 28 has corresponding longitudinal grooves 47 opening therefrom.

When, as is sometimes the case, a sheath 49 of xylonite or other nonmetallic material surrounds the exposed face of the metal rim it is desirable, as shown in Figure 11, that such sheath be shorter than the enclosed metal rim, so that the ends of the former abut against the top and bottom faces of the member 18.

In Figures 3 and 9 the frictional face of the rim portion 21 is convex and the intermediate cooperating portion of the roll 35 is concave, but those cooperating portions may be of other shapes. In Figures 5 to 8 inclusive, for instance, the frictional face 51 of the portion 21 is shown substantially flat rather than convex, and the cooperating portion 52 of the roll 35 is cylindrical.

The degree of frictional interengagement of the movable rim end portion 21 and roll 35 is largely a matter of choice. I prefer, as shown in Figures 3, 4, 9, 10 and 11 to effect this end by means of rack teeth 54 on the portion 21, engaged by gear teeth 55 on the roll 35, which give superior results. Other satisfactory frictional means for interengagement are, as shown in Figure 5, to provide one member with a smooth face 57 and the other member with a milled surface 58; or, as shown in Figure 6, to provide the members with knurled faces 60 and 61; or, as shown in Figure 7, to provide the members with milled faces 63 and 64.

I claim:—

1. In an ophthalmic frame, an end piece provided with a guideway, a split rim having one end fixed to the end piece and its free end slidable in the guideway towards and from the fixed end, an operating roll rotatably mounted in the end piece transversely of and in contact with the free end of the rim, said roll and said free end having interengaging parts whereby rotation of said roll moves said free end.

2. In an ophthalmic frame, an end piece provided with a guideway and with a hole disposed transversely to the guideway and communicating therewith, a split rim fixed at one end to the end piece and having its free end slidable in the guideway, and an operating roll rotatably mounted in the hole in engagement with said free end, said roll and said free end having interengaging parts whereby rotation of said roll moves said free end.

3. In an ophthalmic frame, an end piece provided with a guideway and with a transversely disposed hole opening into the guideway, a split rim having one end fast to the end piece and its free end slidable in the guideway towards and from the fixed end, an operating roll rotatably mounted in the hole and engaging the free end, said roll and said free end having interengaging parts whereby rotation of said roll moves said free end and resilient means for restraining the rotation of the roll.

4. In an ophthalmic frame, an end piece provided with a guideway and with a transverse hole opening into the guideway, a split rim having one end fast to the end piece, and its free end slidable in the guideway towards and from the fixed end, an operating roll rotatably mounted in the hole in engagement with said free end, said roll and said free end having interengaging parts whereby rotation of said roll moves said free end, a retaining member on the end piece engaging the outer end of the roll, and a resilient member in the hole interposed between the end piece and the inner end of the roll.

5. In an ophthalmic frame, an end piece provided with a guideway, a split rim fixed at one end to the end piece and having its free end slidable in the guideway, and means transversely mounted in said end piece and engageable with said free end at different points along the length thereof to lock it in adjusted position in said guideway.

6. In an ophthalmic frame, an end piece provided with a guideway, a split rim fixed at one end to the end piece and having its free end slidable in the guideway, a rack on said free end, and a gear mounted in said end piece and meshing with said rack.

7. In an ophthalmic frame, an end piece provided with a guide way, a rim comprising a body portion adapted to embrace a lens and having a portion slidable in said guideway, and means in said end piece mounted for rotation transversely with respect to the slidable portion and engageable therewith for moving said slidable portion in said guideway.

8. In an ophthalmic frame, an end piece provided with a guide way, a split rim comprising a body portion with one end secured to the end piece and adapted to embrace a lens and having its free end slidable in said guideway, and means in said end piece mounted for rotation transversely with respect to the free end and engageable therewith for moving said free end in said guideway.

In testimony whereof I have affixed my signature.

WAYNE S. SEARLES.